Figure 1:
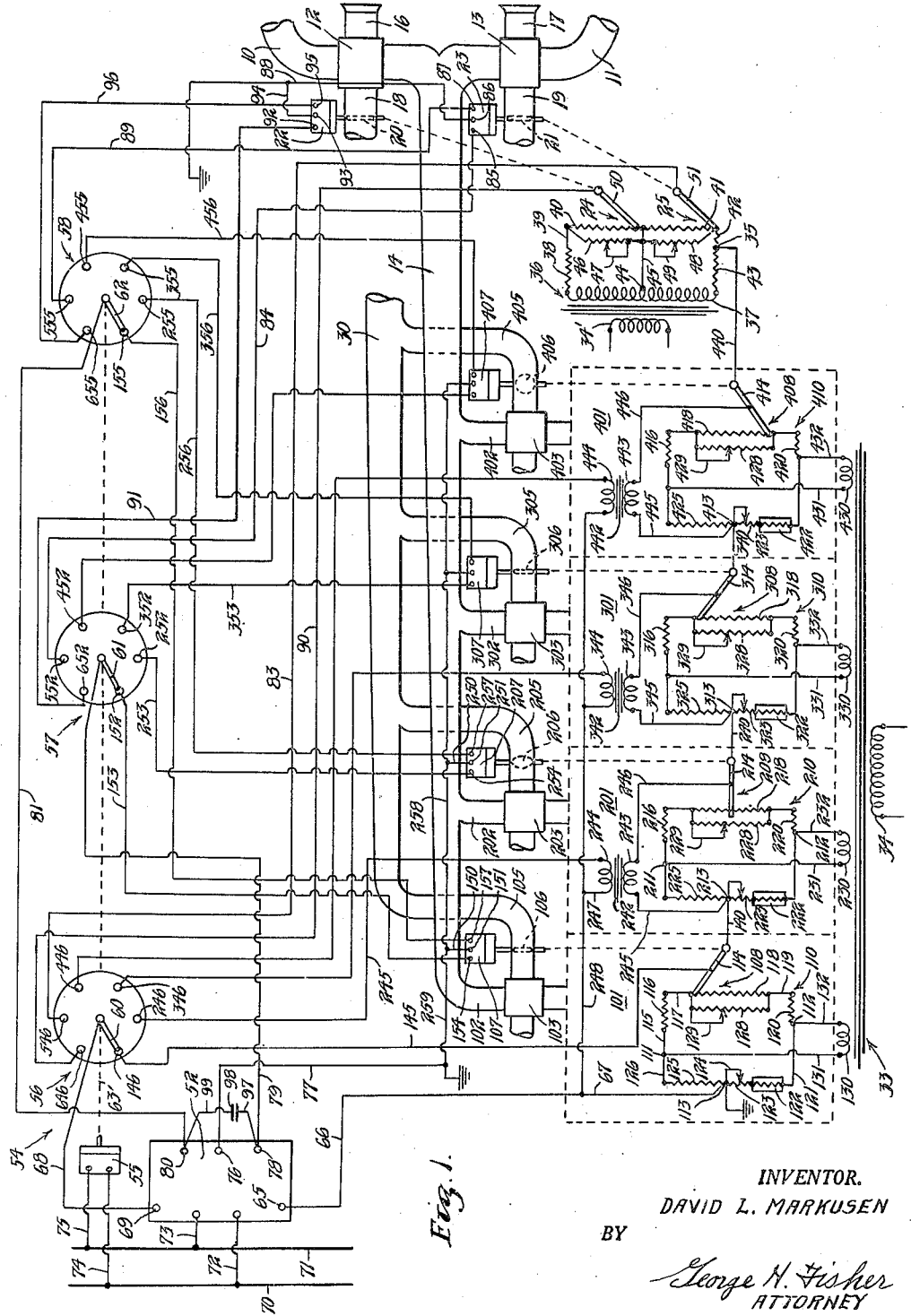

INVENTOR.
DAVID L. MARKUSEN

Jan. 31, 1950   D. L. MARKUSEN   2,495,856
CONTROL APPARATUS
Filed April 6, 1946   2 Sheets-Sheet 2
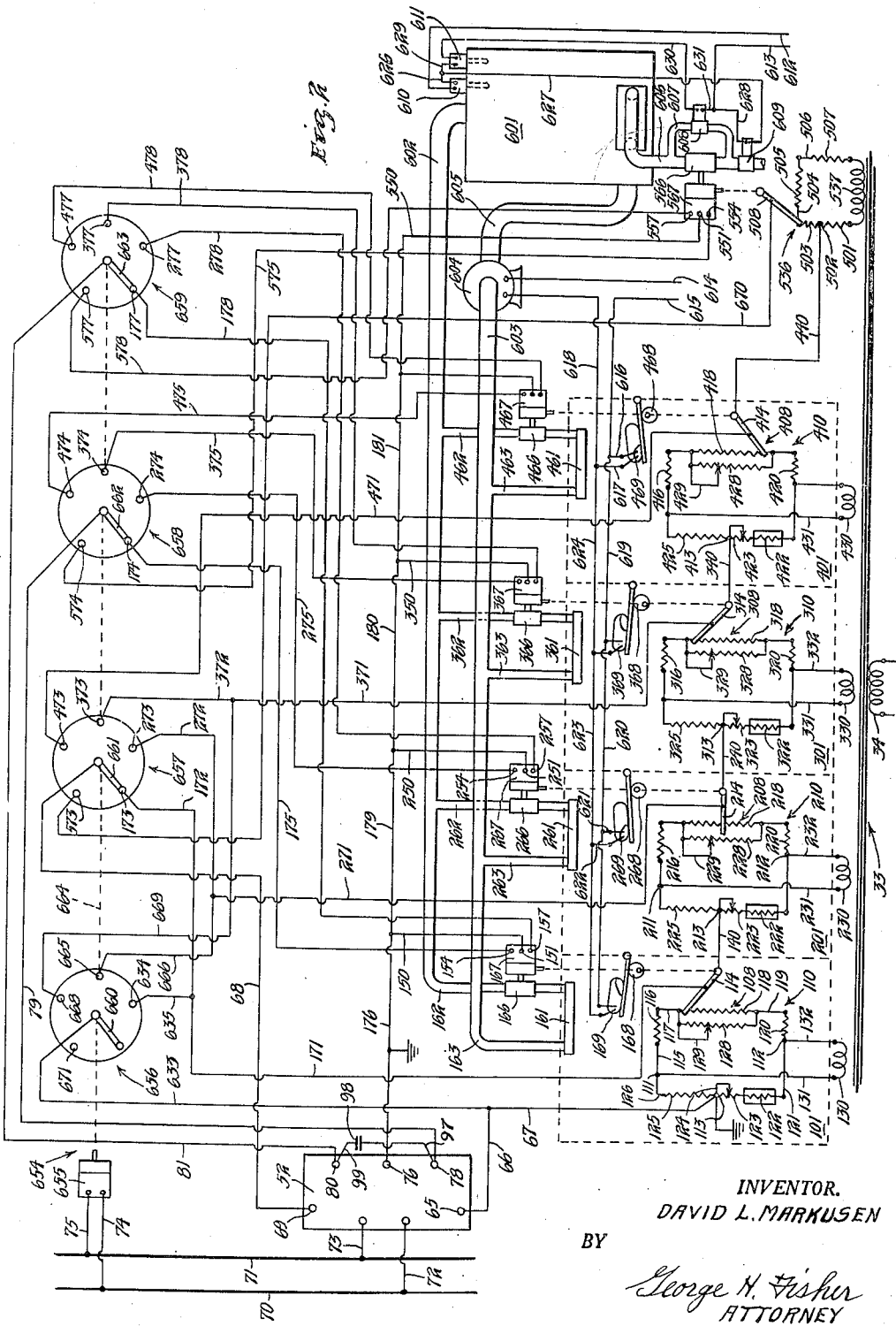
INVENTOR.
DAVID L. MARKUSEN
BY
George H. Fisher
ATTORNEY Patented Jan. 31, 1950

2,495,856

UNITED STATES PATENT OFFICE 2,495,856

CONTROL APPARATUS

David L. Markusen, Minneapolis, Minn., assignor to Minneapolis-Honeywell Regulator Company, Minneapolis, Minn., a corporation of Delaware Application April 6, 1946, Serial No. 660,099

20 Claims. (Cl. 257—3)

The present invention relates to improved control apparatus for a plural zone temperature control system wherein the supply of temperature changing medium, its temperature, or both, are individually controlled for the respective zones and wherein the total supply of medium, its temperature, or both, are controlled in response to the cumulative demand of all of the zones.

It is known that a condition such as temperature is more effectively controlled if the supply of condition changing medium, or its temperature, or both, are reasonably close to that required to maintain the desired condition in the space being treated. Obviously, this problem becomes more complicated as additional spaces must be treated or conditioned from a single supply of condition changing medium, for the supply must then be adequate for the cumulative demand of all of the spaces. It is thus an object of the present invention to provide a condition controlling system for a plurality of spaces or zones wherein each of the zones is individually controlled and wherein the condition changing medium supplied to the zones is just adequate to meet the total demand of all of the zones.

It is an additional object to provide an electronic control system for individually controlling a plurality of zones and for controlling the zones as a whole. Closely related to this object is the desire to provide apparatus of the sort described useful in buildings and ideally suited to railway cars, aircraft and the like. Additionally, it is desired to provide a system easily compensated and readily adapted to stage and proportioning control of the condition changing apparatus.

It is an additional object to provide such an electronic system using a single amplifier to respond to conditions in a plurality of locations and to control a plurality of condition changing devices.

It is a further object to provide control apparatus of the sort described for a pressurized aircraft cabin wherein the air supplied to the cabin is heated to some extent by the compressing of the same, wherein the air supplied to each zone may be further heated to meet the demands of the individual zones, and wherein the heat of compression of the air supplied may be reduced to lower the temperature of an overheated zone.

It is also an object to provide a control system comprising a plurality of series connected networks wherein each network may be individually used for controlling function and wherein the entire series may be used for an additional controlling function.

It is an additional object to provide temperature control apparatus for a plurality of zones wherein the supply of temperature changing medium to each zone is varied in response to the demand in said zone and wherein the temperature changing ability of the medium supplied to the zones as a whole is controlled to meet the cumulative demands of all the zones.

It is a further object to provide means for controlling the cooling of ventilating air being supplied to a plurality of zones in response to the cumulative demand for said cooling.

It is also an object to provide means for controlling the change of temperature of a medium being supplied to a plurality of zones in response to the total requirements for change of one sort minus the total requirements for change of another sort.

It is a further object to provide a plurality of connected electrical networks capable of being unbalanced in response to a condition and to be partially rebalanced, at least one of said networks being capable of being unbalanced due to cumulative unbalances of other networks only partially rebalanced.

These and other objects will become apparent upon a study of the present specification and drawings wherein:

Figure 1 is a schematic illustration of the present invention applied to an aircraft having four conditioned zones; and Figure 2 is a schematic illustration of the invention applied to a structure heated by hot water and having four zones.

Figure 1, as above noted, shows schematically the present invention as applied to a large pressurized cabin passenger carrying airplane. In this airplane, not shown, the cabin is divided into four zones, 101, 201, 301 and 401. As is well known in aircraft of this type, the air for ventilation is first compressed and then delivered to the cabin, which is sealed, and the air is released from the cabin through a regulating valve adjusted to maintain a desired pressure within the cabin space. The air may be compressed by the turbosuperchargers of the engines of the aircraft or by auxiliary compressing means, not shown, and the compressed air is then delivered through ducts 10 and 11 and after-coolers 12 and 13, respectively to a main duct 14 from which the air is distributed to the zones of the cabin. Compressed air from duct 14 is delivered to zone 101 through duct 102 and heat exchanger 103, to zone 201 through duct 202 and heat exchanger 203, to zone 301 through duct 302, and heat exchanger 303, and through duct 402 and heat exchanger 403 to zone 401.

It is well known that the compressing of air results in the generation of heat, consequently the air delivered through branches 10 and 11 to duct 14 is heated to an extent depending upon the amount of the compressing of the same. Under some conditions, the amount of heat added to the air by compressing will be just sufficient to meet the heat demands of the respective zones. However, under some conditions, the heat of compression will be excessive and the air delivered to the zones will therefore be too warm. To permit cooling of the air delivered from the compressors, after-coolers 12 and 13 are provided. These after-coolers are merely heat exchangers through which the compressed air passes through one set of passages and through which cooling air passes through other passages. The cooling air for the heat exchangers enters through ram air inlets 16 and 17 and discharges through conduits 18 and 19, respectively. The flow of cooling air through cooler 12 and conduit 18 is controlled by damper or valve means 20 which is adjusted by geared motor means 22, whereas the flow of cooling air through cooler 13 and conduit 19 is adjusted by damper means 21 adjusted by geared motor means 23. In addition to adjusting its respective valve or damper means, motor means 22 also adjusts a rebalancing potentiometer 24, and motor means 23 adjusts rebalancing potentiometer 25. These rebalancing potentiometers are adjusted by the shafts which drive the respective damper means and serve a purpose to be later described. Motor means 22 and 23 are conventional reversible geared motors adapted to adjust their respective dampers and follow up potentiometers in a relatively short time. These motors preferably include internal switches for limiting the travel of the driven shaft, although obviously any conventional limit switch means may be used. Also, for motors not harmed by stalling, limit stops may be used instead of switches. Although any reversible motors may be used, I prefer the common two-phase capacitor type motor for this use.

While it has been noted that heat is added to the air used for ventilating the zones of the cabin by the compressing of the said air, and while this heat may sometimes be excessive in amount, it might also be inadequate to meet the demands in the respective zones. Therefore, means are provided for supplying added heat to the zones. As a source of heat, a conventional combustion type heater may be provided, or heat exchangers receiving heat from the exhaust of the engine may equally well be used. The source of heat is of little importance in the present invention, hence the specific means for providing the heat has not been shown. Assuming that a supply of heated air or gases is available, the same is delivered through main duct 30 to the heat exchangers as follows: from main duct 30 through duct 105 to heat exchanger 103, through duct 205 to heat exchanger 203, through duct 305 to heat exchanger 303, and through duct 405 to heat exchanger 403. These heat exchangers are conventional and have one set of passages for the heated gases and another set of passages for the air to be heated. Damper means 106, 206, 306 and 406, adjusted by geared motor means 107, 207, 307 and 407, respectively, are provided for controlling the flow of heated gases through the respective ducts and heat exchangers. In addition, motor means 107 also adjusts a rebalancing potentiometer 108, it being driven from the same shaft as damper means 106. Rebalancing potentiometers 208, 308 and 408 are driven by their respective motors 207, 307 and 407, respectively, in the same fashion.

Motor means 107, 207, 307 and 407 are each preferably two-phase reversible geared type motors including limit switches, and are similar to motors 22 and 23 previously described excepting that the gear trains are such that their operating rotation is opposite to that of motor means 22 and 23. Obviously, identical motor means could be used by merely reversing the leads to motors 22 and 23.

With the apparatus as above described, it is now noted that air is supplied to the zones of the aircraft cabin through branch ducts 10 and 11, main duct 14 and the respective branches to the individual zones. With damper 106, which controls the supply of heat to heat exchanger 103, shown in a closed position, it may be assumed that zone 101 is sufficiently warm that no heat needs to be added by heat exchanger 103, consequently the air passing to the zone through duct 102 possesses only its heat of compression. Damper 206 is shown in a partly opened position; hence, it may be assumed that zone 201 needs some heat in excess of that furnished by the heat of compression of the air entering through duct 202. Therefore, a limited amount of heated air or gas is permitted to pass through duct 205 and heat exchanger 203 to additionally warm the air passing through the said duct 202 into zone 201. As shown, damper 306 is in a closed position; hence, zone 301 appears to need no added heat, as in zone 101. With the damper 406 in a wide open position, it would appear that maximum heat is demanded in zone 401 and that the air entering through duct 402 is being additionally warmed by the maximum amount of heat that can be delivered through duct 405 and heat exchanger 403 to the air passing through duct 402. It is thus noted that dampers 106, 206, 306 and 406 control the addition of heat to the air delivered to the respective zones, and dampers 20 and 21, which control the flow of air through the after-coolers, control the cooling of the air going to all of the zones. As before noted, each of the present dampers is controlled by its own motor means; hence, it will be seen that the control of these motors is an important part of the present invention.

The means for controlling the present motor-driven dampers comprises a compound electrical network comprising individual networks for each zone and an additional network for the after-coolers. As each of the present networks 110, 210, 310 and 410 in the respective zones is essentially similar, network 110 will be fully described and numbered and the other networks will be less fully numbered and described although the description of the same will be considered to be the same as that of network 110 excepting that numbers with a proper first digit for the zone involved are used.

Network 110 includes input terminals 111 and 112, output terminal 113 and another output terminal comprising wiper 114 of rebalancing potentiometer 108. The upper right-hand branch of network 110 includes wire 115, fixed resistor 116, wire 117, and the portion of resistor 118 of follow-up potentiometer 108 which lies above wiper 114; the lower right-hand branch of the network comprises the portion of resistor 118 lying below wiper 114, wire 119, and fixed resistor 120. The lower left-hand branch of the network includes wire 121, a temperature responsive resistor, or thermistor, 122, and a control point selector resistor 123 having an adjustable wiper 124. The upper left-hand branch of the network comprises fixed resistor 125 and wire 126. In addition, a differential adjusting potentiometer having a resistor 128 and an adjustable wiper 129 is connected in parallel with resistor 118 to permit an adjustment of the potential drop across resistor 118. Input terminals 111 and 112 of the network are supplied current from secondary winding 130 of transformer 33 which has a primary winding 34 energized from a suitable source of alternating current. Secondary winding 130 is connected to terminals 111 and 112 by wires 131 and 132, respectively. Networks 210, 310, and 410 are similarly energized from their respective secondary windings 230, 330 and 430 of transformer 33. It will further be noted that wiper 114 of network 110 is connected by wire 140 to output terminal 213 of network 210; wiper 214 of network 210 is connected by wire 240 to output terminal 313 of network 310; wiper 314 of network 310 is connected by wire 340 to output terminal 413 of network 410, and wiper 414 of network 410 is connected by wire 440 to output terminal 35 of network 36.

As actually constructed, network 36 would likely be differently arranged and the transformer supplying current to the same would correspond to transformer 33, hence, the primary winding of the transformer of this network is numbered 34' to point out this similarity. Of course, a different transformer could be used, care being taken to keep the phase relation of the same correct.

Network 36 includes a tapped secondary winding 37 connected in series with fixed resistor 38, wire 39, resistor 40 of follow up potentiometer 24, resistor 41 of follow up potentiometer 25, fixed resistor 42, output terminal 35, fixed resistor 43 and secondary winding 37. A center tap 44 of said secondary winding is connected by wire 45 to the junction between resistors 40 and 41. In addition, a potentiometer having a resistor 46 and an adjustable wiper 47 is connected in parallel with resistor 40 between wires 39 and 45. Further, a similar potentiometer having a resistor 48 and an adjustable wiper 49 is connected in parallel with resistor 41 in a similar fashion. These potentiometers are used for adjusting the potential drop across resistors 40 and 41, respective, for adjusting the operating differential of the after-cooler motors. The other output terminal of network 36 comprises either wiper 50 of rebalance potentiometer 24, or wiper 51 of rebalance potentiometer 25.

For a purpose which will become apparent, it is necessary that isolating transformers 242, 342, and 442 be used. Transformer 242 includes a primary winding 243 and a secondary winding 244, these windings being of a 1-1 ratio and having a relatively high impedance. Windings 343, and 344 of transformer 342, and windings 443 and 444 of transformer 442 are similar to those of transformer 242. Transformer primary winding 243 is connected by wire 245 to terminal 213 and to wiper 214 by wire 246. Likewise, winding 343 is connected by wire 345 to terminal 313 and is connected to wiper 314 by wire 346. Winding 443 is connected by wire 445 to terminal 413 and the said winding is connected to wiper 414 by wire 446. While it is noted that these isolating transformers are necessary in the control apparatus as shown, it is noted that they may be eliminated by providing an additional bank of contacts on the sequence switch, to be described.

As is customary in the case of network circuits for controlling a condition, as in the present case, suitable amplifying means must be used to make the output signal of the network circuits sufficiently large to control the aforementioned motors. While a plurality of amplifiers might be used in a circuit of the present sort, I prefer to use a single amplifier 52 of the electronic sort and to use it for each individual network, as well as the compound network, by alternately connecting it in the desired manner by sequence switch means. In the present apparatus, any conventional motor controlling amplifier capable of controlling one circuit when a suitable signal of predetermined phase is impressed upon the input terminals of the said amplifier, and capable of controlling another circuit when a signal of opposite phase is impressed upon the same. As an example of an amplifier-relay unit of this sort which has been found very satisfactory, reference is made to an application of Albert P. Upton, Serial No. 437,561, filed April 3, 1942, now Patent No. 2,423,534, issued July 8, 1947. Obviously, amplifiers of a different sort, such as a polarized relay, can also be used.

To permit the use of but a single amplifier-relay unit in the present system, a sequence switch 54, driven by a geared motor 55 is provided. Three banks of switching contacts, 56, 57 and 58 and including movable switch blades 60, 61 and 62, respectively, are provided. Wipers 60, 61 and 62 are simultaneously actuated by a shaft 63 driven by motor 55. Each bank of contacts on the present switching means comprises six stationary contacts to be connected in a manner to be described. Generally speaking, switch bank 56 determines which network is connected to the amplifier, switch bank 57 connects one winding of the respective motor with the amplifier, while switch bank 58 connects the other winding of the respective motor to the amplifier.

With the present apparatus thus generally described, the relation of the various parts will be made more clear by the following description of operation.

*Operation*

In considering the operation of the present apparatus, it is convenient to assume that it is installed in a large aircraft, as described, and with the airplane in flight so that there is a heat load present. As before noted, the cabin of the airplane is considered as being divided into four zones. Air is furnished to all of the zones through conduits 10 and 11 which lead from suitable compressors, as previously noted, and is delivered to the individual zones through conduit means previously described. The air furnished to the zones possesses heat of compression and may or may not need further heating, depending upon the conditions. Further, it may need cooling and thus require use of after-coolers 12 and 13. To provide added heat, the previously mentioned source of heat, such as a combustion heater or a heat exchanger associated with the exhaust system of one or more of the engines of the airplane, provides heated air or gases through conduit 30 to the respective heat exchangers associated with each air duct leading to a zone, as before described.

To put the present system in operation, it is necessary that the various units of the same be energized. Sequence switch 54 is energized by the circuit: line wire 70, wire 74, motor 55, wire 75 and line wire 71. Amplifier-relay unit 52 is energized by the circuit: line wire 70, wire 72, amplifier 52, wire 73 and line wire 71. Likewise, primary windings 34 and 34' are also energized from line wires 70 and 71 by circuits not shown. Suitable switches, not shown, may be used to control the energization of the above mentioned apparatus, but assuming that the line wires are energized and the apparatus connected as described, the system is now in readiness for operation. It is noted that the damper motors are energized through circuits controlled by the amplifier, as will be noted in the following description.

It is noted that the present networks are energized by alternating current and amplifier-relay unit 52 has been described as one which controls one circuit when a signal of a predetermined phase is impressed upon it and controls another circuit when a signal of an opposite phase is fed into it. However, it is rather confusing to describe the present series of networks in their operating relation in terms of phase of the signal voltages involved. It is more convenient to consider the present network during the instant of a half cycle during which time direct current relations hold. Thus, a condition in which a leading voltage would be present is analogous to a positive potential and a condition of a lagging voltage is analogous to a negative potential. Specifically, in this description, the left-hand terminals of the transformer secondary windings may be considered positive and the right-hand terminals negative. It should therefore be kept in mind as this description proceeds that phase relations rather than relative potentials are actually involved.

As previously noted, network 110 is in control of zone 101. This network receives current from secondary winding 130 of transformer 33 through input terminals 111 and 112, and its output signal is taken from terminal 113, grounded, and wiper 114, as noted in the previous description. Now, if wiper 129 is adjusted so that a two-volt potential will exist across resistor 118 and a one degree change in temperature at thermistor 122 will alter the balance of the network by one volt then it may be assumed, when the network is also suitably adjusted by shifting wiper 124 over resistor 123, that the network is balanced when the temperature affecting thermistor 122 is 72° and wiper 114 is at the upper extreme of resistor 118, or with the temperature at thermistor 122 at 70° and wiper 114 at the bottom extreme of resistor 118. With the network balanced as shown and the temperature at thermistor 122 at 72°, a drop to 70°, and with no rebalancing taking effect, will result in wiper 114 becoming two volts positive relative to terminal 113.

With the apparatus in the position shown, and with a drop of temperature at 122, resulting in wiper 114 becoming positive relative to 113, as previously described, a signal is impressed on amplifier 52 by the circuit: wiper 114, wire 145, contact 146 and blade 60 of switch bank 56, wire 68, terminal 69 of amplifier 52, terminal 65 of the amplifier, wire 66 and wire 67 to grounded terminal 113 of network 110. With a positive signal impressed on amplifier 52, the following circuit controlling operation of damper 106 is energized: terminal 78 of amplifier 52, wire 79, switch blade 61 of sequence switch bank 57, contact 152, wire 153, terminal 154 of motor 107, terminal 151, wire 150, wire 259, wire 77 and common terminal 76 of amplifier 52. Also, current is supplied the motor 107 from terminal 78 by the circuit: terminal 78, wire 97, condenser 98, wire 99, terminal 80, wire 81, switch blade 62 of bank 58, contact 155, wire 156 and terminal 157 of motor 107. Due to condenser 98, the voltage applied to terminal 157 leads that applied to terminal 154; hence motor 107 is caused to operate in a direction to drive damper 106 toward an open position. As damper 106 moves toward an open position, heated gases flowing from conduit 30 through conduit 105 and heat exchanger 103 warm the air flowing through conduit 102 and thus tend to raise the temperature in zone 101. In addition to increasing the temperature of the air flowing into zone 101, operation of damper 106 in an opening direction also results in driving wiper 114 downwardly across resistor 118. As wiper 114 moves downwardly across resistor 118, it becomes less positive relative to terminal 113 and normally will eventually reach a point at which the network is balanced and the positive signal ceases. When this happens, and no signal is fed into the amplifier, the aforementioned circuit to motor 107 is opened and the said motor stops operating. Had the temperature affecting 122 been 71°, movement of motor 107 would have continued until wiper 114 was driven approximately half way across resistor 118 before the network could be balanced. However, had the temperature been 70° at thermistor 122, a full opening movement of damper 106 and a corresponding movement of wiper 114 to the bottom of resistor 118 would have been required to balance the network. A further drop in temperature would be of no avail in increasing heat because once the damper is driven to wide open position, limit switches prevent further operation of the motor and, as the damper is in wide open position, no more heat can be added. Because the equipment provided for furnishing heat in an aircraft is generally very powerful, it is contemplated that damper 106 will be driven to a fully open position only under most unusual conditions.

With damper 106 open and wiper 114 near the bottom of resistor 118, the air being delivered through duct 102 into zone 101 possesses not only its heat of compression but is also further heated by the gases flowing through heat exchanger 103 under control of damper 106, as previously noted. With large quantities of heat being provided for zones 101, the inevitable result is a rise in temperature which is reflected in an increase in resistance of thermistor 122. Assuming that wiper 114 is at the bottom extreme of resistor 118 and the temperature at thermistor 122 becomes 71°; wiper 114 will now be one volt negative relative to terminal 113, hence a negative signal is impressed on amplifier 52 by the same circuit previously described. A negative signal impressed on amplifier 52 causes current to flow through the following circuit: terminal 80 of amplifier 52, wire 81, switch blade 62 and terminal 155 of switch bank 58, wire 156, terminal 157 of motor 107, terminal 151, wire 150, wire 259, wire 77 and common terminal 76 of the said amplifier. Also, the other winding of motor 107 is energized by the circuit: terminal 80, wire 99, condenser 98, wire 97, terminal 78, wire 79, switch blade 61 and contact 152 of bank 57, wire 153 and terminal 154 of motor 107. The voltage applied to terminal 154 now leads that applied to terminal 157; hence, motor 107 is caused to operate in a reverse direction and drives damper 106 in a closing direction.

This direction of operation also causes movement of wiper 114 upwardly across resistor 118 and thus makes wiper 114 less negative with respect to terminal 113. If the temperature at 122 remains at 71°, the network would then become balanced when wiper 114 reaches the mid point of resistor 118. However, if the temperature continues to increase and rises to 72°, movement of damper 106 will continue toward closed position and wiper 114 will continue to be driven upwardly until it reaches the upper extreme at which point the network is again balanced: there is no signal fed into amplifier 52, and the circuit causing closing movement of damper 106 is opened, thereby stopping motor 107. If the temperature in zone 101 should continue to increase even though damper 106 has been driven to a closed position, the network becomes unbalanced with wiper 114 becoming more negative with respect to terminal 113 as the temperature at 122 increases. Further rebalancing of the network is impossible because wiper 114 is at the extreme of its movement and limit switches in the motor prevent further operation in a closing direction. If the temperature at 122 should rise to 73°, wiper 114 would then become one volt negative relative to terminal 113 or, if the temperature rose to 74°, wiper 114 would then be two volts negative relative to terminal 113. For reasons which will appear later, it is convenient to consider that the present heating cycle in zone 101 has resulted in over-heating the zone to the extent that the temperature is 74° and there is an unbalanced signal from the network wherein wiper 114 is two volts negative relative to terminal 113.

In discussing the operation of the present apparatus as it relates to zone 101, it has been assumed that the network was continuously in charge of motor 107. However, since the signal connection to the amplifier and the controlling connections from the amplifier to the motor are through sequence switch 54, these connections are periodically interrupted. Assuming that sequence switch 54 is operated so that blades 60, 61 and 62 make one revolution per minute, then each contact is engaged by its respective switch blade for less than ten seconds. This works out very well for the amount of readjustment of the respective dampers needed each minute is quite small. Further, the slight delay between the periods at which control is exercised permits conditions within the zones to become somewhat more stabilized thereby rendering the system less erratic. Assuming that the sequence switch rotates in a counter-clockwise direction, it is noted that after the switch blades leave contacts 146, 152 and 155 they next engage contacts 246, 252 and 255. Further, after leaving these contacts the blades then engage the third set of contacts, then the fourth, fifth, sixth, and then repeat the cycle, as is obvious.

If it be considered that the sequence switch has operated so that the switch blades are on the second set of contacts, then network 110 is no longer in charge of amplifier 52 and network 210 is connected in controlling relation to the said amplifier. The connections are as follows: output terminal 213 and wiper 214 of network 210 are connected to primary winding 243 of transformer 242 by wires 245 and 246, respectively. Secondary winding 244 of said transformer 242 is connected through wires 247, 248 and 66 to terminal 65 of amplifier 52 and through wire 245, contact 246, switch blade 60, and wire 68 to input terminal 69 of the said amplifier. As before noted, windings 243 and 244 of transformer 242 have a 1–1 ratio and a relatively high impedance. Thus, whatever signal is impressed on the primary winding of the transformer, the same signal is taken from the secondary winding of the said transformer. This assumes that the windings of these transformers are arranged so that the left terminal of each secondary winding will be at the same potential as the left terminal of the respective primary winding. The effect on the amplifier is just the same as if terminal 213 was directly connected to terminal 65 of the amplifier and wiper 214 directly connected to terminal 69, as in the previous example. However, the present isolating transformers are used to prevent the conditions of balance of the other networks from affecting the signal from the network in question. As previously noted, by providing an additional bank of contacts on the sequence switch, the present isolating transformers can be eliminated but lack of space has prevented this in the present figure. These isolating transformers are made with a relatively high impedance so that, when the networks are connected in series, as will be described, the shunting effect of each isolating transformer on its respective network is negligible. Assuming that the adjustments of network 210 are similar to those of network 110, and the network is thus balanced when the temperature at thermistor 222 is 72° and wiper 214 is at the top of resistor 218; or, at a temperature of 71°, the wiper 214 is in the mid point of resistor 218; or, at a temperature of 70°, wiper 214 would be at the bottom of resistor 218, changes of temperature in zone 201 will have the same controlling effect as those in zone 101. With the network balanced as shown and with a temperature of 71° at 222, a decrease in temperature at 222 will cause wiper 214 to become positive relative to terminal 213 and thus cause a positive signal to be impressed on amplifier 52 by the aforementioned circuit. This will cause a further opening movement of damper 206 by the circuit: terminal 78 of amplifier 52, wire 79, switch blade 61, terminal 252, wire 253, terminals 254 and 251 of motor 207, wire 250, wire 258, wire 259, wire 77, and terminal 76 of the amplifier. Also, terminal 78, wire 97, condenser 98, wire 99, terminal 80, wire 81, switch blade 62 and contact 255, wire 256 and terminal 257 of motor 207. Likewise, a rise in temperature at 222 causing an increase in resistance at 222 will tend to make wiper 214 negative relative to terminal 213 and thus cause a negative signal to be impressed on the amplifier. This will cause energization of a circuit as follows: terminal 80 of amplifier 52, wire 81, switch blade 62, terminal 255, wire 256, terminal 257, terminal 251, wire 250, wire 258, wire 259, wire 77 and common terminal 76; in addition, terminal 80, wire 99, condenser 98, wire 97, terminal 78, wire 79, blade 61 and contact 252, wire 253 and terminal 254 of motor 207. Energization of this circuit causes motor 207 to operate in a damper closing direction. It is thus seen that the operation of network 210 is exactly the same as that of network 110 excepting that the signal is furnished to the amplifier through a 1–1 ratio transformer instead of directly as in the previous example. For reasons which will appear, it is convenient to assume that the temperature in zone 201 is 71° and the network is in balance, as shown.

The relation of network 310 in zone 301 to its controlling motor 307 is precisely the same as the aforementioned network and the operation is the same as that described. With a drop in temperature in zone 301, damper 306 is adjusted to an open position and wiper 314 is moved downwardly across resistor 318 while an increase in temperature in the zone causes damper 306 to be driven to a closed position and wiper 314 is adjusted upwardly across the said resistor. Likewise, with the network balanced with wiper 314 at the upper end of resistor 318 and with a temperature of 72° at resistor 332, an increase in temperature at thermistor 322 to 73° will result in wiper 314 becoming one volt negative relative to terminal 313. For reasons which will appear, it is convenient to assume that the temperature in zone 301 is 73° and there is a one volt negative signal from this network.

Likewise, network 410 in zone 401 performs the same function relative to motor 407 as did the previous networks relative to their motors. In this example, as in the others, a relatively low temperature in the zone causes motor 407 to drive damper 406 in an open direction and move wiper 414 downwardly across resistor 418 and an increase in temperature in the zone causes an upward movement of wiper 414, as before described. With the parts in a position shown, it may be assumed that the temperature in the zone is 70°, full heat is being called for, and the network is balanced.

It has now been shown that each of the four zones of the aircraft cabin is provided with its own individual heat control apparatus effective through a common amplifier. A single amplifier is sufficient for the several zones because a sequence switch sequentially places each of the networks in control of the amplifier and simultaneously places the amplifier in control of the proper motor. It is further noted that zone 110 was assumed to be at a temperature of 74°, hence the network for that zone was unbalanced to the extent of a two volt negative signal. Network 210 in zone 201 was balanced due to a temperature of 71° and a midpoint adjustment of wiper 214; zone 301 was at a temperature of 73°, hence network 310 was unbalanced to the extent of a negative signal of one volt and network 410 was balanced at a temperature of 70°. It was previously pointed out that these networks are connected in series and it will now be observed that the cumulative unbalance of all of the networks is three volts negative. This follows because wiper 114 is 2 volts negative with respect to grounded terminal 113; terminal 213 is at the same potential as wiper 114, and because network 210 is balanced, wiper 214 is also at the same potential, that is, negative 2 volts. Terminal 313 is at the same potential as 214 but wiper 314 is one volt negative with respect to terminal 313. Therefore wiper 314 is 3 volts negative with respect to terminal 113. Terminal 413 is at the same potential as 314 and wiper 414 is at the same potential as terminal 413 due to the balanced condition of network 410, hence wiper 414 is 3 volts negative with respect to grounded terminal 113.

When sequence switch 54 operates so that its blades are on the fifth set of contacts, all of the previously mentioned networks are connected in series with network 36 to control amplifier 52 by the circuit: wiper 51, wire 83, contact 546, blade 60, wire 68, terminal 69 of amplifier 52, terminal 65, wire 66, wire 67, terminal 113, network 110, wiper 114 of said network, wire 140, terminal 213, network 210, wiper 214 of said network, wire 240, terminal 313, network 310, wiper 314 of said network, wire 340, terminal 413, network 410, wiper 414 of said network, wire 440, terminal 35, and network 36. Network 36 is so connected that it is in phase with the other networks previously considered. Therefore, if it be assumed that the bottom end of secondary winding 37 is at zero potential, the upper end of the same would have a positive potential. It follows that, due to resistor 42, terminal 35 is negative relative to the bottom end of resistor 41. For the purpose of this description, it will be assumed that the bottom end of resistor 41 is at a potential one volt higher than terminal 35. Resistor 42 is used to stabilize the system by requiring at least a predetermined unbalance of the compound network before the aftercooler motors can be operated. The value of this resistor is more or less arbitrarily chosen. It may further be assumed that wipers 47 and 49 of adjusting potentiometers 46 and 48, respectively are so adjusted that there is a three volt drop across resistor 40 and also a three volt drop across resistor 41. With conditions as thus established, if terminal 35 is at zero potential (neglecting the unbalance voltages across networks 110 to 410) the bottom end of resistor 41, and wiper 51 in the position shown, are at a potential of positive one volt. In this case, motors 22 and 23 are so connected to amplifier 52 that the circuit closed by a negative potential being impressed on the amplifier causes operation of the motors to open their respective dampers. This direction of motion, different from that of the previously described motors, is due to the aforementioned reverse gearing in these motors. Therefore, with a potential at wiper 51 of one volt positive, the damper 21 is closed and further operation of motor 23 is prevented by the limit means of the said motor. Likewise, wiper 50 is at a potential of positive four volts and damper 20 is closed with further motion of motor 22 prevented by the limit means of the motor.

If it now be assumed that terminal 35 is at a potential of negative three volts, due to the aforementioned summation of unbalances of the network in the zone, then wiper 51 would be at a potential of two volts negative. This signal impressed on amplifier 52 by the previously described circuit would cause motor 23 to be energized in a damper opening direction by the circuit: terminal 80 of amplifier 52, wire 81, switch blade 62, contact 555, wire 89, terminal 87 of motor 23, terminal 86 of said motor, and wire 88 to ground. Normally, instead of merely going to ground, wire 83 would connect with common and grounded terminal 76 of amplifier 52, but this connection has not been shown for lack of space. In addition, the other winding of motor 23 would be energized by the circuit: terminal 80, wire 99, condenser 98, wire 92, terminal 78, wire 79, blade 61, contact 552, wire 84, and terminal 85 of motor 23. Energizing this circuit of motor 23 causes it to drive damper 21 in an opening direction thereby permitting aftercooler 13 to cool the air passing through duct 11 so that the air furnished to the zones will be somewhat lowered in temperature. The air furnished through duct 14 and the respective zone ducts will then tend to increase the heat load in the zones requiring heat, but will tend to lower the temperature in the zones that are over heated. In addition to driving damper 21 in an opening direction, wiper 25 is adjusted upwardly across resistor 41. If it be assumed that terminal 35 was at a potential of three volts negative, then wiper 25 would be adjusted two-thirds of the distance upwardly across resistor 41 before the signal would be rebalanced and the negative signal to amplifier 52 wiped out. At the same time that the signal to amplifier 52 is being diminished by the rebalancing effect of wiper 25, the cooler air furnished the zone is having an effect of its own. The cooler air furnished to zone 110 will tend to reduce its temperature and therefore reduce the unbalance of the network thereby reducing the negative signal from the said network. In zone 201, the cooler air being furnished to the same will merely result in damper 206 being driven slightly more open to add more heat to the air to maintain the temperature at the desired level. In zone 301, the reduction in air temperature will tend to restore the balance of the network and thus diminish the negative signal from network 310. A reduction in air temperature furnished to zone 401 would still further increase the heating load, but as maximum heat is already being furnished to this zone and no further rebalancing can take place, any further drop in temperature below 70° will result in a positive signal from network 410. This positive signal will tend to oppose the negative signals remaining from networks 110 and 310. If it be assumed that the net signal now left from all of the zone networks is one volt negative, then wiper 51 is at a potential three volts positive to terminal 35 or two volts positive with respect to the bottom end of resistor 41. This positive signal impressed on amplifier 52 causes energization of a circuit as follows: terminal 78 of amplifier 52, wire 79, switch blade 61, contact 552 of switch bank 57, wire 84, terminal 85 of motor 23, terminal 86 and wire 88 to ground; also terminal 78, wire 97, condenser 98, wire 99, terminal 80, wire 81, blade 62, contact 555, wire 89, and terminal 87 of said motor. This causes a reverse action of motor 23 which drives damper 21 toward closed position and drives wiper 51 toward the bottom of resistor 41.

If the signal at 35, resulting from considerable overheating in the zones, was at a potential of four volts negative relative to ground, wiper 51 would need to be driven to the upper end of resistor 41 to rebalance the compound network and wipe out the negative signal being impressed on amplifier 52. This would result in a wide open position for damper 21. If the overheating in the zone should be even more pronounced and result in a signal at terminal 35 of, for instance, six volts negative, it will be noted that this negative signal cannot be rebalanced by movement of the wiper 51. While wiper 51, in moving to the upper end of resistor 41 could rebalance a negative signal of four volts, there would still remain a negative signal of two volts. Therefore, when the sequence switch adjusts its blades to the sixth set of contacts a two volt negative signal is impressed on amplifier 52 by the circuit: wiper 50, wire 90, contact 646, blade 60, wire 68, terminal 69 of the amplifier, terminal 65, wire 66, wire 67, grounded terminal 113, network 110, wiper 114, wire 140, terminal 213, network 210, wiper 214, wire 240, terminal 313, network 310, wiper 314, wire 340, terminal 413, network 410, wire 440, and terminal 35 of network 36. This negative signal causes an opening movement of damper 20 by the circuit: terminal 89 of amplifier 52, wire 81, switch blade 62, contact 655, wire 96, terminal 95 of motor 22, terminal 93, wire 94 to ground; also, terminal 80, wire 99, condenser 98, wire 97, terminal 78, wire 79, blade 61, contact 652, wire 91 and terminal 92 of the motor. The energization of this circuit causes motor 22 to drive its damper in an opening direction and to adjust wiper 50 upwardly across resistor 40. As in the previous example, to rebalance a negative signal of two volts on wiper 50, it would be necessary to adjust the said wiper ⅔ of the way upwardly across resistor 40 before the network would again be balanced and the negative signal to the amplifier wiped out. Therefore, the air furnished to the zones through duct 14 would be cooled to the maximum by after-cooler 13 and cooled to approximately ⅔ capacity by after-cooler 12. As noted previously, the cooling of the air supplied to the zones reduces the over-heating of the same and lowers the negative signal that comes from the respective networks and may even cause a positive signal from some zone that requires more heat. This would tend to diminish the negative signal at terminal 35 of network 36 and thereby cause wiper 50 to become positive relative to terminal 35 and cause a positive signal to be impressed on amplifier 52 by the aforementioned circuit. A positive signal impressed on amplifier 52 will cause a closing movement of damper 20 by the circuit: terminal 78 of amplifier 52, wire 79, switch blade 61, contact 652, wire 91, terminal 92 of motor 22, terminal 93 of said motor, and wire 94 to ground; also, terminal 78, wire 97, condenser 98, wiper 99, terminal 80, wire 81, blade 62, contact 655, wire 96, and terminal 95 of the motor. Energizing of this circuit causes a reverse movement of motor 22 which drives damper 20 to closed position and adjusts wiper 50 downwardly across resistor 40.

While the present description relates the action of various control means in steps, it is obvious that many of the functions of the present apparatus are simultaneously performed. For instance, the balance of a network is affected substantially simultaneously by adjustment of the respective wiper and also by the effect of changing the damper position associated with the said wiper. In addition, it should be kept in mind that the individual network, or the compound network, is only in control of its respective damper motor for a few seconds and thus can only make a partial adjustment in response to demand. If further adjustment is needed in the same direction when the sequence switch again reaches its previous position, further adjustments will then be made in the same direction. If conditions have changed during the cycle of the sequence switch, then the respective damper motor will be operated in response to the new condition.

While the present apparatus has been rather specifically set forth, it is obvious that many modifications and substitutions are possible. Further, the present teachings are useful in condition control systems generally. To give a concrete example of the use of the present system in a more conventional condition control system, reference is made to the following description of Figure 2.

*Figure 2*

In Figure 2, the present system is shown as applied to a more conventional heating apparatus such as may be used in an aircraft, a railway car or a residence. Four zones are used as before, and because the zones and the control networks are the same as in the prior illustration, the same numbering is used in this illustration.

In this figure, the hot water boiler 601 applies heated water through pipe 602 and branches 162, 262, 362 and 462 to heat exchangers 161, 261, 361 and 461, respectively, located in zones 101, 201, 301 and 401, as shown. The return flow from the heat exchangers is taken through branches 163, 263, 363 and 463, pipe 603, circulator 604, and pipe 605 back to the boiler. The circulation of the heated water to the heat exchangers in the respective zones is individually controlled by valves located in the supply branches such as valve 166 in branch 162. Valve 166 is adjusted by geared motor means 167, this motor means being preferably of the same sort previously described. Likewise, valve 266 is adjusted by motor means 267, valve 366 by motor means 367 and valve 466 by motor means 467.

Fuel is supplied to boiler 601 through conduit 606, the fuel flow being controlled by a conventional solenoid valve 609 and a proportionally adjustable valve 566, driven by geared motor means 567. Motor means 567 is similar to the other motor means described and is geared to operate in the same direction as the other motor means. For a purpose which will appear, by-pass means 607 controlled by solenoid valve 608 is arranged around valve 566 to permit operation of the boiler even if valve 566 is closed. Additional control means for boiler 601 comprises a high limit control 610 adjusted to open its contacts when the boiler water reaches a predetermined high temperature, such as about 215 degrees. Further, a low limit control 611 is provided which is adjusted to close its contact when the boiler water temperature drops below a predetermined value, such as 90°.

In addition to motor means 167 adjusting valve means 166 and operating potentiometer wiper 114, as in the previous example, said motor means also operates a mercury switch means 169 by means of a cam 168. The cam is so adjusted that the contacts of the switch are open when valve 166 is closed and wiper 114 is at the top of resistor 118. However, the adjustment is such that the initial opening movement of valve 166 results in tipping switch 169 so that its contacts will be closed. In a similar fashion, motor means 267 operates switch means 269 by means of cam 268, motor means 367 operates switch means 369 by means of cam means 368, and motor means 467 operates switch means 469 by means of cam 468. As will be noted, each of these switch means is capable of controlling the operation of circulator means 604.

Amplifier-relay unit 52 is the same as that described in the previous illustration and has been similarly numbered. Sequence switch 654 is generally similar to that of Figure 1, but includes 4 banks of switches each having 5 contacts. In this switch means, motor means 655 drives shaft 664 which carries switch blades 660, 661, 662 and 663. Motor means 655 may comprise any suitable geared motor capable of driving the switch means at the required speed, such as one revolution per minute.

To control the present system, the same electrical networks 110, 210, 310 and 410, previously described, are shown in zones 101 to 401, respectively. Although the present networks are the same as previously described, the isolating transformers are omitted in this case, due to the provision of another bank of contacts on the sequence switch. Because these networks are the same as previously described, the same numbering has been retained. As in the previous illustration, the individual networks in the zones are connected in series with a further network identified as 536. Network 536 comprises a secondary winding 537 forming part of transformer 33 and connected in series with fixed resistor 501, output terminal 502, fixed resistor 503, a nonresistance slide portion 504, resistor 505, wire 506 and resistor 507. The other output terminal of the network comprises wiper 508 which is adjusted across slide portion 504 and resistor 505 by motor means 567. Terminal 502 is connected to wiper 414 by wire 440, and the cumulative condition of balance of the networks in the respective zones is rebalanced by adjustment of wiper 508 across resistor 505. Resistor 503 is used to make slide portion 504 about two volts negative relative to terminal 502 so that an unbalance of the zones of at least two volts is required before a positive potential can appear on wiper 508. The function of this network, as well as that of the rest of the apparatus will be described in greater detail in the following operation schedule.

*Operation of Figure 2*

For convenience in the present description, it will be considered that each of the networks in the zone is adjusted to be in balance with a temperature of 72° affecting the thermistor of the said network and with the follow up potentiometer wiper, 114 for instance, at the uppermost extreme of its respective resistor. The system is energized similarly to that of Figure 1 with motor 655 of sequence switch 654 being energized from the line wires by the circuit: line wire 70, wire 74, motor 655, wire 75 and line wire 71. Amplifier-relay unit 52 is energized by the circuit: line wire 70, wire 72, amplifier 52, wire 73 and line wire 71. Primary winding 34 of transformer 33 is connected to the line wires by suitable wiring, not shown. Likewise, wires 612 and 613 of the boiler control apparatus are connected to the line wires in a suitable fashion. Also, wires 614 and 615, for energizing circulator 604, are connected to a suitable source of current by wiring, not shown. With the apparatus energized and the parts in the position shown, it is noted that wiper 114 in zone 101 is at the upper extreme of resistor 118, hence valve 166 is closed and the contacts of switch 169 are open. In zone 201, wiper 214 is at the mid-point of resistor 218, hence it is assumed that valve 266 is approximately half open, and the contacts of switch 269 are closed. Assuming that network 210 is balanced in the position shown, it would then appear that the temperature in zone 201 affecting thermistor 222 is 71°. In zone 301, wiper 314 is at the upper limit of resistor 318, valve 366 appears to be closed and the contacts of switch 369 are opened. As in zone 101, it may be assumed that the temperature affecting thermistor 322 is 72°. In zone 401, wiper 414 is seen to be at the bottom of resistor 418 thus indicating that valve 466 is wide open, and the contacts of switch 469 are seen to be closed.

With both switches 269 and 469 closed, circulator 604 is operating by the circuit: wire 615, wire 616, switch 469, wire 617, wire 618, circulator 604, and wire 614. Circulator 604 is also energized by a parallel circuit as follows: wire 615, wire 619, wire 620, wire 621, switch 269, wire 622, wire 623, wire 624, wire 618, circulator 604, and wire 614.

With wiper 508 at the extreme left of slide portion 504, it follows that valve 566 is closed, but assuming that the system has just been put into operation, and that the water in boiler 601 is less than 90°, for instance, the boiler is furnished fuel through valves 608 and 609. Valve 609 is opened by the circuit: wire 612, high limit control 610, wire 626, wire 627, solenoid valve 609, wire 628 and wire 613. This permits gas to flow through either valve 566 or by-pass 607. However, as before noted, valve 566 is closed. Valve 608 is opened by the circuit: wire 612, high limit control 610, wire 626, wire 629, low limit control 611, wire 630, solenoid valve 608, wire 631 and wire 613. As the boiler water temperature is below the predetermined value of 90°, the contacts of low limit control 611 are closed thereby permitting valve 608 to be opened and permitting gas to flow through by-pass 607 to operate the boiler. The by-pass 607 may be considered to have a sufficient capacity to operate the boiler at a relatively low level, such as 20 per cent of its maximum capacity. With the boiler being heated by gas flowing through by-pass 607, it will be noted that as the boiler water temperature rises above 90°, limit control 611 will open its contacts and thus close solenoid valve 608. It will be seen that the purpose of the low limit control 611 and solenoid valve 608 is to maintain the boiler water at a sufficient temperature to provide small increments of heat to the zones immediately upon there being a demand for the same. The high limit control 610 is used to control main solenoid valve 609 to prevent further firing of the boiler when such operation would become dangerous. The present control means for the boiler are considered to be illustrative only and form no part of the present invention.

With boiler 601 operating, and water of approximately 90° F., temperature being circulated through supply pipe 602 and returned through pipe 603, circulator 604 and pipe 605 back to the boiler, it is noted that this heated water is supplied to zone 201 due to valve 266 being about half open and is also being supplied to zone 401 due to valve 466 being entirely opened. None of this water is being supplied to zone 101 or 301 because valves 166 and 366 are closed. Due to the relatively low temperature of the water supplied the heat exchangers 251 and 451 in zones 201 and 401, respectively, only a light heat load can be taken care of without further operation of the boiler. However, if the structure including the several zones is subjected to conditions considerably increasing the heat load, the temperature in each of the zones may fall. With a decrease in temperature at thermistor 122, wiper 114 tends to become positive relative to terminal 113, hence, a positive signal is impressed on amplifier 52 by the circuit: wiper 114, wire 171, wire 172, contact 173, blade 661, wire 68, terminal 69 of amplifier 52, terminal 65 of said amplifier, wire 66, and wire 67 to grounded terminal 113 of network 110. As before noted, this imposes a positive signal on the amplifier which causes motor means 167 to be energized in a valve opening direction by the circuit: terminal 78, wire 79, switch blade 662, contact 174, wire 175, terminal 154 of motor means 167, terminal 151, wire 150, wire 176 and common terminal 76. Also, the other winding of motor means 167 is energized by the circuit: terminal 78, wire 97, condenser 98, wire 99, terminal 80, wire 81, switch blade 663, contact 177, wire 178, and terminal 157 of motor means 167. This energizes motor means 167 in a manner to drive valve 166 toward open position and to move wiper 114 downwardly across resistor 118. So long as the temperature affecting thermistor 122 does not drop below 70°, wiper 114 will be moved until the network is balanced, as in the previous example. Assuming that a considerable heat load has been imposed on the zones, as before noted, and the temperature continues to drop in spite of the fact that wiper 114 is moved to the bottom of resistor 118, thus indicating that valve 166 is wide open, each degree drop in temperature below 70°, and with wiper 114 at the bottom of resistor 118, will result in wiper 114 becoming one volt more positive relative to terminal 113. For reasons which will appear, it may be assumed that the temperature affecting thermistor 122 reaches 68°, thus making the unbalance of network 110 two volts positive. As an incident to opening of valve 166, it should be noted that switch 169 was tipped to close its contacts, so that if there had been no demand for operation of the circulator by any of the other zones, switch 169 could have placed the same in operation.

If sequence switch 654 now operates its blades to the next set of contacts, network 210 of zone 201 will be placed in charge of amplifier 52 by the circuit: wiper 214, wire 271, wire 272, contact 273, blade 661, wire 68, terminal 69, terminal 65, wire 66, wire 633, blade 660, contact 634, wire 635, wire 171, wiper 114, wire 140, and terminal 213 of network 210. Also, it is noted that terminal 65 of the amplifier is grounded by the circuit: terminal 65, wire 66, wire 67 to grounded terminal 113 of network 110. With a heavy heat load being imposed on zone 201, the temperature in the same will be considered to fall and as it falls below 71°, wiper 214 becomes positive relative to terminal 213 thus causing operation of motor means 267 by the circuit: terminal 78, wire 79, switch blade 662, contact 274, wire 275, terminal 254 of motor means 267, terminal 251, wire 250, wire 179, wire 176 and terminal 76. Also, the other winding of the motor means is energized by the circuit: terminal 78, wire 97, condenser 98, wire 99, terminal 80, wire 81, blade 663, contact 277, wire 278, and terminal 257 of motor means 267. As before noted, this will cause operation of motor means 267 in a direction to further open valve 266 and to drive wiper 214 downwardly across resistor 218. This will continue so long as the motor is permitted to operate and until wiper 214 reaches the bottom of resistor 218. If the temperature should continue to drop, the network would become unbalanced and, if the temperature should reach 69°, for instance, wiper 214 would become 1 volt positive relative to terminal 213.

In a similar manner, when the switch blades of the sequence switch advance to the next set of contacts, network 310 of zone 301 would be placed in charge of amplifier 52 by the circuit: wiper 314, wire 371, wire 372, contact 373, blade 661, wire 68, terminal 69, terminal 65, wire 66, wire 633, blade 660, contact 655, wire 666, wire 271, wiper 214, wire 240 and terminal 313 of network 310. Terminal 65 of amplifier 52 remains grounded by a circuit previously traced. With network 310 in charge of amplifier 52, the amplifier will then cause suitable operation of motor 367 to adjust valve 366 in a manner to meet the heat requirements of the zone and to adjust wiper 314 in a direction to rebalance the network in a manner similar to that described for networks 110 and 210. The energizing circuit for the motor can be traced in exactly the same manner as the energizing circuit for motors 167 and 267 with the exception that the contacts, wires and terminals start with a higher number corresponding to the zone in question. For the present, it will be assumed that the temperature in zone 301 does not drop below 70°, hence network 310 will be assumed to be in balance and there will be no signal resulting from the same.

At the next step in the operation of sequence switch 654, and with the blades on the fourth set of contacts, network 410 of zone 401 is placed in charge of amplifier 52 by the circuit: wiper 414, wire 471, contact 473, blade 661, wire 68, terminal 69, terminal 65, wire 66, wire 633, blade 660, contact 668, wire 669, wire 371, wiper 314, wire 340 and terminal 413 of network 410. With network 410 in charge of amplifier 52, changes in temperature affecting thermistor 422 will affect the balance of the network and thereby the signal imposed on amplifier 52 in the same manner as would the previous networks. Likewise, motor 467 will be operated in one direction or another in the same manner as the previous motors. In the position shown, wiper 414 is at the bottom of resistor 418, indicating that valve 466 is wide open. This would also indicate that the temperature at thermistor 422 which resulted in this arrangement was relatively low. Assuming that the temperature drops due to the heavy heat load previously noted, it may now be considered that the temperature of the zone is at 67°; hence, wiper 414 may be assumed to be 3° positive relative to terminal 413. While a positive signal at the wiper of a network generally operates to cause opening of the valve, it is obvious that the valve cannot be driven beyond wide open due to the limit or stop means associated with the motor.

At the next position of the blades of the sequence switch, a compound network including networks 110, 210, 310, 410 and 536 is placed in control of amplifier 52 by the circuit: wiper 508, wire 670, contact 573, blade 661, wire 68, terminal 69, amplifier 52, terminal 65, wire 66, wire 67, terminal 113 of network 110, network 110, wiper 114, wire 140, terminal 213, network 210, wiper 214, wire 240, terminal 313, network 310, wiper 314, wire 340, terminal 413, network 410, wiper 414, wire 440, terminal 502 and network 536. Assuming that resistor 503 is of such resistance value that the slide portion 504 is two volts negative relative to terminal 502, then it will appear that wiper 508, in the position shown, with a two-volt positive signal from zone 101, a one-volt positive signal from zone 201, and a three-volt positive signal from zone 401, will be at a potential 4 volts positive relative to grounded terminal 113. With amplifier 52 energized as above described, it causes operation of motor means 567 by the following circuit: terminal 78, wire 79, blade 662, contact 574, wire 575, terminal 554 of motor means 567, terminal 551, wire 550, wire 181, wire 180, wire 179, wire 176 and terminal 76 of amplifier 52. The other winding is energized by the circuit: terminal 78, wire 97, condenser 98, wire 99, terminal 80, wire 81, blade 663, contact 577, wire 578 and terminal 557 of the said motor means. This causes operation of motor 567 in a direction to open valve 566 and to move wiper 508 to the right across slide portion 504 and resistor 505. However, due to slide portion 504, the beginning movements of wiper 508 to the right causes no rebalancing due to the lack of resistance of the slide portion. This is provided so that any opening movement of valve 566 will be sufficient to cause proper operation of the burner. For the purpose of this discussion, it may be assumed that valve 566 should be at least 20 per cent open for such proper operation. Therefore, slide portion 504 would be of such a length that the wiper would traverse it while valve 566 is driven to a 20 per cent open position. If there is a five-volt potential difference existing across resistor 505, then it appears that wiper 508 must be driven most of the way across resistor 505 before the 6 volt positive signal at terminal 502 can be rebalanced. This will mean that valve 566 is nearly wide open and boiler 601 is operated at a high level of capacity. It will be noted that it is possible for valve 566 to open and supply fuel to the boiler at the same time that valve 608 and by-pass 607 is open, but it will be obvious that the relatively large fuel supply to the boiler will quickly raise the boiler water temperature above the low limit setting of controller 611 and thus open its contacts. When the contacts of 611 open, valve 608 is closed and full control of the fuel supply to the boiler is assumed by valve 566.

With the boiler water temperature raised to a relatively high value due to the large supply of fuel being furnished the boiler, the temperature in each of the zones may be rather rapidly increased. In zone 101, for instance, it was assumed that the temperature had reached 68°, valve 166 was wide open and wiper 114 was 2 volts positive relative to terminal 113 of the network 110. With a full supply of relatively hot water being supplied heat exchanger 161, the temperature may be assumed to rise above 70° in the zone and thus make wiper 114 negative relative to terminal 113. If the sequence switch is assumed to be in the position shown, so that network 110 is in charge of the amplifier again, a negative signal is then imposed on the amplifier by the circuit previously traced. The negative signal causes operation of the amplifier in a manner to control motor 167 by the circuit: terminal 80, wire 81, blade 663, contact 177, wire 178, terminal 157 of motor means 167, terminal 151, wire 150, wire 176 and terminal 76 of the amplifier. The other winding of the motor is energized by the circuit: terminal 80, wire 99, condenser 98, wire 97, terminal 78, wire 79, blade 662, contact 174, wire 175 and terminal 154 of the motor means. It will be noted that this circuit for controlling motor means 167 is the same as that previously traced with the exception that condenser 98 is in the circuit supplying current to terminal 154 instead of the circuit supplying current to terminal 157. The effect of this is to cause operation of the motor 167 in a reverse direction from that previously described. A reverse operation of motor 167 causes a closing movement of valve 166 and advances wiper 114 upwardly across resistor 118 to rebalance the network. As the temperature rises above 70°, the network will then be kept in balance by sufficient movement of 114 in the manner noted.

With the blades of the sequence switch 654 advancing to the second set of contacts, thus placing network 210 in charge of amplifier 52, a similar operation of this network may be considered in exactly the same manner as that of network 110. As the temperature rises in zone 201 due to the large supply of heat available, the temperature affecting thermistor 222 will increase its resistance as the said temperature rises and makes wiper 214 less positive relative to terminal 213. When the temperature rises above 70° in the zone, the network can be rebalanced in a manner previously described and the positive signal will be removed. As the sequence switch continues to operate, and networks 310 and 410 are successively placed in control of the amplifier, any positive signal resulting from low temperatures in the zones will be reduced as the zone temperatures rise in the manner just discussed. When the sequence switch reaches the fifth set of contacts and the compounded network is again in charge of the amplifier, it will be noted that the summation of positive potentials, previously six volts, has now been reduced. Assuming that the sum is three volts, then wiper 508 in its previously noted right-hand position will be three volts negative relative to terminal 113 and a reverse operation of motor 567 will be called for in the same manner that reverse operation was required of motor 167. The reverse operation of motor 567 will cause a closing movement of valve 566 and a movement of wiper 508 to the left across resistor 505. The closing movement of valve 566 will reduce the supply of heat to the boiler and thus decrease the temperature of the water being supplied to the zone. Also, the reduction in boiler water temperature will decrease the heat supplied to the various zones so that the rate of temperature rise in the same will be slowed. Thus, it will be seen that boiler 601 is operated just sufficiently to meet the heat demands of all the zones while the heat supplied to the individual zones is regulated in accordance with the temperatures in the said zones.

While this invention has been rather specifically described in the present disclosure, it is clear that many substitutions and equivalents are obvious. For instance, any conventional motor can be used instead of the two-phase capacitor type motors described. Further, a two-phase motor such as described may be operated by an amplifier of the sort described, which, instead of operating relays, energizes one winding of the motor. The other winding of the motor is energized directly from the line, with a condenser in the circuit. It is noted that this type of amplifier-motor control is also disclosed in the aforementioned Upton application. As these and many other substitutions and equivalents are feasible, it is considered that the scope of the present invention should be determined only by the appended claims.

I claim as my invention:

1. In a control system, a plurality of devices to be controlled, a reversible motor means for each of said devices, amplifier means, sequence switch means for sequentially placing said amplifier in control of each of said motor means, a plurality of network circuits each including an impedance variable in response to a predetermined condition, an additional network circuit, means connecting all of said network circuits in series, and means including said switch means for sequentially and individually connecting each of said condition responsive network circuits in control of said amplifier means substantially simultaneously with the connection of a motor means with said amplifier means, said switch means also sequentially connecting the series of all of said network circuits in control of said amplifier means substantially simultaneously with the controlling of another of said motor means by said amplifier means.

2. In control apparatus for a plurality of zones, means for changing a predetermined condition in each of said zones, means in each zone responsive to said condition for independently controlling said condition changing means, individual follow-up means operable in response to operation of each of said condition changing means, the operating range of said follow-up means being less than that of said condition responsive means, additional means operable to change said condition in all of said zones, means connecting said zone condition responsive means and said additional means in series, and follow-up means operable as a function of the operation of said additional condition changing means for supplementing said first named follow-up means by rebalancing the cumulative unbalance of the series of networks.

3. In a temperature changing system for a plurality of zones, a central means for changing the temperature of a medium, means for distributing the medium to heat exchange means for each of the zones, means for regulating the distribution of said medium to each of said zones, an electrical network means including an impedance variable in response to temperature change in each zone for controlling said regulating means, means for varying the capacity of said central means, and means connecting said network means in a manner to control said varying means in response to the total demand for change of temperature of said medium.

4. In control apparatus of the sort described for a plurality of zones, means for changing a condition in each of said zones, an electrical network for each of said zones, means for connecting each of said networks in controlling relation to its respective condition changing means, additional condition changing means, and means for connecting said networks in series and in controlling relation to said additional condition changing means.

5. In an aircraft having a cabin divided into a plurality of zones, means for supplying air under pressure to each of said zones, means for cooling said air, means for individually heating the air supplied to each of the zones, means responsive to the temperature of each zone for controlling the heating means for that zone, and means responsive to all of said temperature responsive means for controlling said cooling means.

6. In an aircraft having a cabin divided into a plurality of zones, means for supplying compressed air having heat of compression to each of said zones, means for individually additionally heating the air supplied to each of said zones, after-cooler means for removing heat of compression from said compressed air, an electrical network circuit including a thermistor for each zone, switch means for sequentially placing each network circuit into controlling relation with its respective individual heating means, and circuit means including said switch means and all of said network circuits for controlling said after-cooler means.

7. In a structure supplied with compressed air, said structure being divided into a plurality of zones, means for individually varying the temperature of the air supplied to each of said zones, means responsive to the temperature in each of said zones for controlling said varying means, means for varying the temperature of the supply of compressed air, and means for connecting each of said condition responsive means together for jointly controlling the means for varying the temperature of the compressed air supply.

8. In a control system, a plurality of devices to be controlled, a reversible motor means for operating each of said devices, amplifier means for controlling said motor means, sequence switch means having a plurality of banks of contacts, one bank of contacts sequentially controlling connections between the amplifier and a winding of each of the motor means, another bank of switch contacts sequentially controlling the connections between the amplifier means and another winding of each of the motor means, a plurality of electrical network circuits connected in series, at least one of said network circuits including an impedance variable in response to a condition indicative of a need for operation of the system, and means including an additional bank of switch contacts for sequentially and individually connecting each of said networks including a condition responsive impedance, and then said series of network circuits, in controlling relation to said amplifier means.

9. In a temperature changing system for a plurality of zones, a central means for changing the temperature of a medium, means for distributing the medium to each of said zones, means for regulating the distribution of said medium to said zones, an electrical network for each zone, said network each including an impedance variable in response to temperature change within the respective zones, means for connecting each of said networks in controlling relation to its respective distribution regulating means, means for varying the temperature changing capacity of said central means, and means for connecting said network in series to control said varying means.

10. In a condition control apparatus for a plurality of condition changing devices, a series of independently operable electrical network circuits each arranged to control one of said devices and capable of becoming unbalanced in response to a need for change in said condition, and additional network including rebalancing means arranged to control another condition changing device, and means connecting said additional network into said series of networks so that said rebalancing means can rebalance the sum of the unbalance of all of said network circuits.

11. In control apparatus for a plural zone central heating system, central means for heating medium, means for distributing the heated medium to the zones, individual means for controlling the supply of heated medium to said zones, individual means responsive to the temperature of said zones, each of said temperature responsive means being arranged to control its respective individual supply controlling means, and means connecting said temperature responsive means together in a manner to control said central heating means, each of said temperature responsive means operating through part of its range to control its individual supply controlling means and through another part of its range to control said central heating means.

12. In control apparatus of the sort described for a plurality of zones, means for changing a condition in each of said zones, an electrical network for each of said zones including an impedance variable in response to changes in said condition for controlling said condition changing means, variations in said impedance altering the balance of said network, means operable in response to operation of said condition changing means for restoring the balance of said network within prescribed limits, additional condition changing means, means connecting all of said networks together for controlling said additional condition changing means, and means operable in response to operation of said additional condition changing means for restoring the balance of all of said networks as a whole.

13. In control apparatus, a plurality of electrical network circuits, means for altering the balance of at least two of said network circuits, means for partially rebalancing each of said network circuits, means responsive to the cumulative unbalance of the partially rebalanced networks, and means for rebalancing the said cumulative unbalance of said networks.

14. In control apparatus, a plurality of series connected normally balanced electrical networks, means for altering the balance of said networks, means for partially rebalancing said networks individually, and means including an additional network connected to said series for rebalancing the cumulative unbalance of the series of networks.

15. In a structure having an enclosure divided into a plurality of zones, means for supplying air under pressure to each of said zones, first means for changing the temperature of said air, means for individually changing the temperature of the air supplied to each of the zones in a sense opposite that of said first means, means responsive to the temperature of each zone for controlling the individual temperature changing means for that zone, and circuit means including all of said temperature responsive means for controlling said first temperature changing means.

16. In a control system for a plural zone temperature changing apparatus, means for supplying temperature changing medium to each of said zones, first means for changing the temperature of said medium for all of said zones, second means for changing the temperature of said medium for each individual zone, means individually responsive to the temperature of each of said zones for controlling the respective second temperature changing means for its zone, and means responsive to the sum of the responses of said temperature responsive means for controlling said first temperature changing means.

17. In apparatus for a temperature changing system for a plurality of zones, first means for changing the temperature of said zones, an electrical network circuit including a resistor variable in response to the temperature changes for each of said zones, second means for changing the temperature in each of said zones, means including the network circuit associated with one of said zones for controlling the second temperature changing means for that zone, and means including a plurality of said network circuits in series for controlling said first temperature changing means.

18. In control apparatus for a plurality of secondary control devices and a primary control device, a plurality of network circuits each including a rebalancing potentiometer and a resistor variable in response to a desired condition, an additional network including a rebalancing potentiometer, means for connecting all of said networks in series, and means for placing each of the networks containing a variable resistor in control of one of said secondary devices and the series of networks including the additional network in control of said primary device.

19. In control apparatus of the sort described, a plurality of normally balanced electrical networks connected in series, each of said networks including means responsive to a predetermined condition and being capable of being unbalanced by such response, means for individually rebalancing a given amount of unbalance of each network, means responsive to the algebraic sum of the existing unbalances of each of said networks, and means for rebalancing said sum of unbalances.

20. In control apparatus of the sort described for a plurality of zones, an electrical network circuit for each zone including an impedance variable in response to temperature changes in said zone, means for changing the temperature in each zone, means for connecting the network for each zone in controlling relation to the temperature changing means of that zone, additional temperature changing means, and means connecting all of said networks together for jointly controlling said additional temperature changing means.

DAVID L. MARKUSEN.

REFERENCES CITED

The following references are of record in the file of this patent:

UNITED STATES PATENTS

| Number | Name | Date |
|---|---|---|
| 2,170,072 | Hartig | Aug. 22, 1939 |
| 2,188,775 | Locke | Jan. 30, 1940 |
| 2,238,433 | Nessell | Apr. 15, 1941 |
| 2,351,695 | Newton | June 20, 1946 |
| 2,408,699 | Sparrow | Oct. 1, 1946 |